United States Patent [19]

Bolton et al.

[11] Patent Number: 4,609,954
[45] Date of Patent: Sep. 2, 1986

[54] TRACKING SERVO FOR A DISK PLAYER WITH A DC MOTOR

[75] Inventors: Richard H. Bolton, East Rochester; Robert P. Cloutier, Spencerport, both of N.Y.

[73] Assignee: Eastman Kodak Company, Rochester, N.Y.

[21] Appl. No.: 585,702

[22] Filed: Mar. 2, 1984

[51] Int. Cl.$^4$ ............................................. G11B 21/08
[52] U.S. Cl. ..................................... 360/78; 318/369; 318/561; 360/106
[58] Field of Search ................... 360/75, 78, 104–106, 360/109; 318/369, 561, 571, 603, 594, 596; 369/32, 33

[56] References Cited

U.S. PATENT DOCUMENTS

| | | | |
|---|---|---|---|
| 3,699,555 | 10/1972 | DuVall | 360/78 |
| 3,731,177 | 5/1973 | Commander et al. | 360/78 |
| 3,812,533 | 5/1974 | Kimura et al. | |
| 3,882,541 | 5/1975 | Ghose et al. | 360/78 |
| 4,031,443 | 6/1977 | Droux et al. | 318/561 |
| 4,099,112 | 7/1978 | Klinger | 318/561 |
| 4,103,314 | 7/1978 | Case | |
| 4,135,217 | 1/1979 | Jacques | |
| 4,166,970 | 9/1979 | Cardot et al. | 318/561 |
| 4,314,291 | 2/1982 | Oda et al. | 360/78 |
| 4,323,997 | 4/1982 | Kuribayashi et al. | |
| 4,330,879 | 5/1982 | Wine | |
| 4,340,949 | 7/1982 | Kelleher | |
| 4,383,207 | 5/1983 | Maury | 318/561 |
| 4,396,959 | 8/1983 | Harrison et al. | |
| 4,422,113 | 12/1983 | Mabon | 360/78 |
| 4,423,446 | 12/1983 | Takahashi et al. | 360/104 |
| 4,506,321 | 3/1985 | Comstock et al. | 318/561 |

FOREIGN PATENT DOCUMENTS

| | | | |
|---|---|---|---|
| 54-140069 | 10/1979 | Japan | 318/561 |
| 54-145109 | 11/1979 | Japan | 360/78 |

OTHER PUBLICATIONS

Brar, Dave, "High Density Recording on a MiniFlexible Disk Drive", *IEEE Trans. on Magnetics*, Jul. 1981, pp. 1423–1425.

Imanaka, R. et al, "Recording and Playing (R/P) System Having Compatibility with Mass Produced Replica Disc", *IEE Trans on Consumer Electronics*, Aug. 1983, pp. 135–139.

Kihara, N. et al, "Electronic Still Camera", *Journal of Applied Photographic Engineering*, Oct. 1983, pp. 159–163.

Kihara, N. et al, "The Electronic Still Camera a New Concept in Photography", *IEEE Trans on Consumer Electronics*, Aug. 1982, pp. 325–330.

Warner Electronic Co., Guide to Selecting and Controlling Step Motors, 1979, ch. 8.

*IBM TDB*, vol. 16, No. 6, "Position Control Servo-Mechanism", Leggate, 11/73, pp. 1907–1909.

*IBM TDB*, vol. 19, No. 3, "Track Location Correction Mechanism for Magnetic Disks", Hanson et al., 8/76, pp. 1039–1041.

*Primary Examiner*—Raymond F. Cardillo
*Assistant Examiner*—Steven R. Garland
*Attorney, Agent, or Firm*—David M. Woods

[57] ABSTRACT

A tracking servo for a disk player controls the movement of a playback head between prerecorded magnetic tracks carried by a magnetic disk. A feedback signal is provided from a timing wheel attached to a cam and gear configuration that connects a dc servomotor to the head. The servo separates the track-to-track movement into two components: one component occurring while the dc motor is energized and another occurring while the dc motor is coasting to a stop, presumably opposite the desired track. The first component of movement continues until the feedback signal corresponds to an intermediate value, which is predetermined for the first movement. At this point the dc motor is turned off but the timing wheel continues to increment the feedback signal as the motor coasts. Should the head be misaligned with respect to the track after the dc motor stops, the final value of the feedback signal is used to modify the intermediate value for the next track-to-track movement. In this way irregularities due to coasting will not accumulate and affect future track-to-track movement.

8 Claims, 8 Drawing Figures

TRACKING SERVO FOR A DISK PLAYER WITH A DC MOTOR

BACKGROUND OF THE INVENTION

1. Field of the Invention

This invention relates to improvements in the art of positioning a sensor with respect to a data track carried by a recording medium. This invention particularly relates, though not exclusively so, to an improved tracking servo for precisely positioning a playback head with respect to a magnetic track prerecorded on a magnetic disk.

2. Description Relative to the Prior Art

Small magnetic disks have found wide use in recent years for data storage in computer applications. Before playing back the data carried by such a disk, a tracking servo accurately positions a playback head opposite a selected magnetic track. The head is typically mounted on a movable head carriage and the carriage is coupled to a servomotor. Given the need for highly accurate movement, a stepper motor is usually chosen for the servomotor because of its inherent precision. (See "High Density Magnetic Recording on a Mini Flexible Disk Drive," by D. Brar, *IEEE Trans. on Magnetics*, Vol. Mag.-17, No. 4, July 1981, pp. 1423–1425). The normal operation of a stepper motor consists of discrete angular movements of predetermined, and mostly uniform, magnitude. These movements are produced by a control signal consisting of a specially generated pulse train. As the Brar article relates, the angular movement of the stepper motor is mechanically transmitted to the head carriage by means such as a band positioner, a cam, or a lead screw.

An electronic still camera has been proposed which uses a small magnetic disk as its memory device (see "Electronic Still Camera," by Kihara, N. et al. *Journal of Applied Photographic Engineering*, Vol. 9, No. 5, October 1983, 159–163). A companion player is envisioned which, when a recorded disk is inserted into it, converts the signals recorded on the disk into a television signal. For a tracking servo for such a disk player, it is appropriate to borrow from the computer disk art, that is, to use the concept of a head carriage driven by a stepper motor. (For example, see "The Electronic Still Camera a New Concept in Photography, "Kihara, N. et al, *IEEE Trans. on Consumer Electronics*, Vol. CE-28, No. 3, August 1982, pp. 325–330, which shows in FIG. 15 a head carriage connected by a lead screw to a stepper motor.)

The control signal for the stepper motor can be provided by "hard wired" logic but, being essentially digital, it can easily be provided directly from a microprocessor (as shown in the Kihara article and in the Guide to Selecting and Controlling Step Motors, by Warner Electric Brake and Clutch Co., 1979, especially chapter 8 thereof). A microprocessor gives the tracking servo (of which the stepper motor is part) the ability to analyze, interpret and modify commands by use of its built-in memory as well as to make changes as a result of feedback information. Many complex functions can be carried out in the software of the microprocessor. For example, the control pulses can be arbitrarily spaced so as to accomplish a complex ramping function just before stopping the stepper motor (i.e., before sending the last pulse), pulse spacing can be varied with load, and so on.

While such servo capability sounds attractive, there are some problems with such a complex system. Being directed to the ordinary consumer, the disk player should include every economy that is practicable. Stepper motors are ordinarily complex and costly, but nonetheless used because they are thought to be essential. A related problem is the extent to which the stepper motor involves the microprocessor. Despite the substantial capability of a microprocessor, its intelligence is harnessed to the moment-by-moment requirements of the stepper motor while the head is being moved from track to track. That is, the stepper motor is constantly in need of intelligent input—in the form of correctly spaced pulses—from the moment the head leaves the previous track until it arrives at the next track. Otherwise the motor—and the head therewith—would stop mid-track. In effect, a sophisticated servomotor—the stepper motor—ties down the microprocessor to the task of generating a train of pulses, one after the other. It would be better if the respective roles could be reversed, that is, the sophistication of the microprocessor could be used to reduce the sophistication required in the servomotor. As the player ordinarily carries a microprocessor for other purposes, use of it to simplify the tracking servo would be a desirable bonus.

SUMMARY OF THE INVENTION

The invention involves a way to use active servo control during part of the track-to-track movement of a magnetic head and then to depend upon the intelligence of the tracking servo's microprocessor to correct for inaccuracies during the rest of the movement. Relaxing constant servo control permits use of a simplified servomotor, for example, an ordinary dc motor, which freewheels during a substantial part of its drive sequence. More particularly, the concept of the invention involves a separation of head movement into two components: one component occurring while the servomotor is energized and a second component occurring while the servomotor is deenergized and coasting (perhaps with braking assist) to a stop. Active servo control is maintained during the first component of movement by adhering to a control parameter; control is cut off during the second component of movement until the motor is stopped. Then computational means, such as "software" in a microprocessor, is used to correct for inaccuracies in movement, either by renewing active servo control to readjust the head or by readjusting the control parameter for the next movement.

In a preferred embodiment of the invention, a motor is connected to a carriage that carries a playback sensor from one track to a second track on a magnetic disk. Feedback means are provided for generating an output signal corresponding to the amount of movement of the sensor. A drive signal is applied to the motor until the feedback output signal matches the value of a control parameter, referred to hereinafter as the intermediate control value. The intermediate control value signifies the end of the first component of movement, i.e., that during which the motor is energized. After the motor has coasted to a stop the feedback output signal is again read; this final value corresponds to the end of the second component of motion. If the final value indicates that the sensor is not centered on the next track, the energized part of the next movement is modified so as to account for irregularity due to coasting in the current movement. The next movement may undertake to position the sensor more closely relative the second track.

Alternatively, and according to the preferred embodiment, the next movement will move the sensor from an area in the vicinity of the second track toward a third track. To account for the irregularity due to coasting, a correction factor is applied to the intermediate control value prior to energizing the motor to move the sensor toward the third track. In this way, errors present in the current movement will not accumulate and affect future track-to-track movements.

BRIEF DESCRIPTION OF THE DRAWINGS

The invention will be described with reference to the figures, wherein.

DETAILED DESCRIPTION OF THE PREFERRED EMBODIMENT

Because the art of magnetic recording and playback is well known in general, and specifically in connection with magnetic disks, the present description will for the most part be directed to elements forming part of, or cooperating more directly with, the present invention. Elements not specifically shown or described may be selected from those known in the art. Unless otherwise noted, other standard circuit elements may be readily substituted for circuit elements specifically mentioned in connection with the accompanying figures. Likewise, the programs described in flow charts by FIGS. 5-8 are merely exemplary of suitable programs; other programs (within the capability of an ordinarily skilled programmer) could carry out the disclosed control function.

Figure 1:
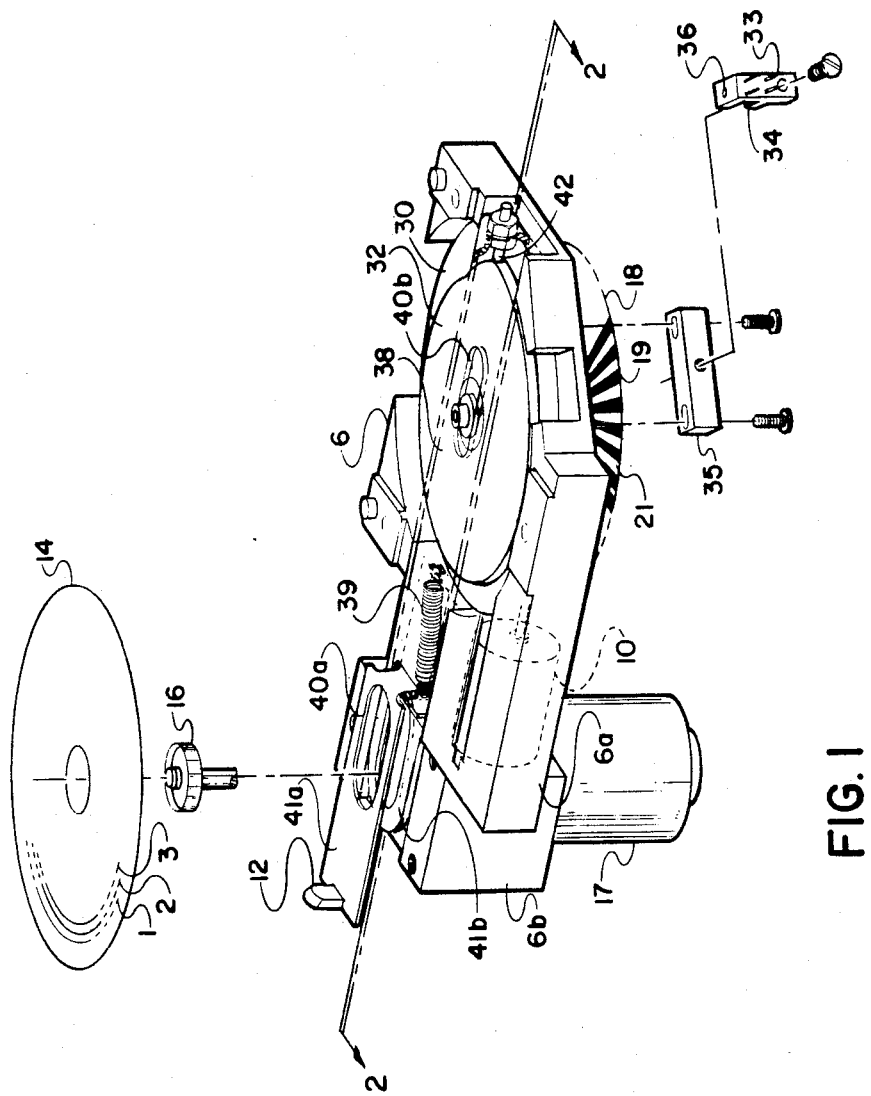
FIG. 1 is a perspective view of the mechanical components of a tracking servo in accordance with the invention.
Figure 2:
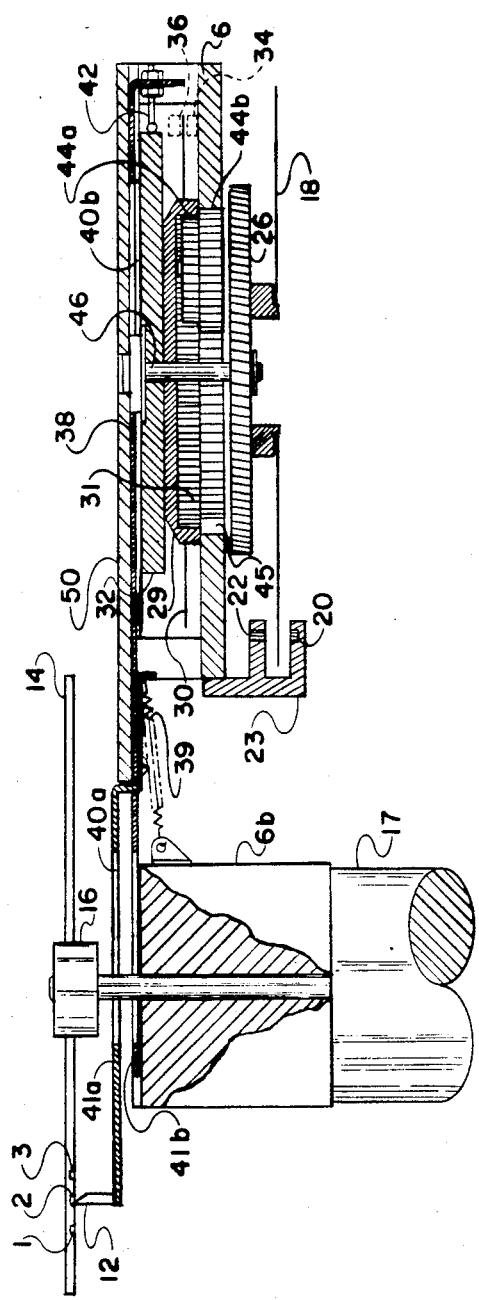
FIG. 2 is a cross sectional view of the tracking servo taken through line 2—2 of FIG. 1.

The mechanical components of the tracking servo according to the invention will be described in connection with FIGS. 1 and 2. Since some of the assembled components of the tracking servo overlie and conceal each other, it will be helpful to simultaneously refer to the version shown by FIG. 3, which explodes the concealed parts for a better view. Unless otherwise stated, the following description will jointly refer to FIGS. 1, 2 and 3 insofar as the described part appears in these figures. The components of the tracking servo comprise a gear and cam configuration mounted for rotation on a support block 6. The gear and cam configuration converts angular movement imparted to the shaft 8 of a reversible DC motor 10 (mounted in an extension 6A of the block 6) to linear movement of a playback sensor between data tracks 1, 2, 3 . . . prerecorded at predetermined distances apart on a disk 14. As disclosed herein, the playback sensor is a magnetic playback head 12 and the disk 14 is a magentic disk. The disk 14 is removably mounted on a spindle 16 for rotation by a disk drive motor 17, which is secured to a mounting block 6B attached to the extension 6A of the support block 6. Each of the prerecorded data tracks 1, 2, 3 . . . contains signals representative of a still picture. While the disk 14 may carry as many tracks as convenient, this embodiment is described in terms of 40 tracks. The tracking servo initiates and controls the reversible movement of the playback head 12 between tracks, that is (for example), from track 1 to track 2, track 2 to track 3, track 3 to track 2, and so on. After each track-to-track movement is completed, the head 12 is disposed opposite the new track in readiness for playback. (As disclosed herein, some tolerance in head-to-track alignment is permitted. Playback may proceed as long as the head 12 is in the near vicinity of the new track.)

Figure 3:
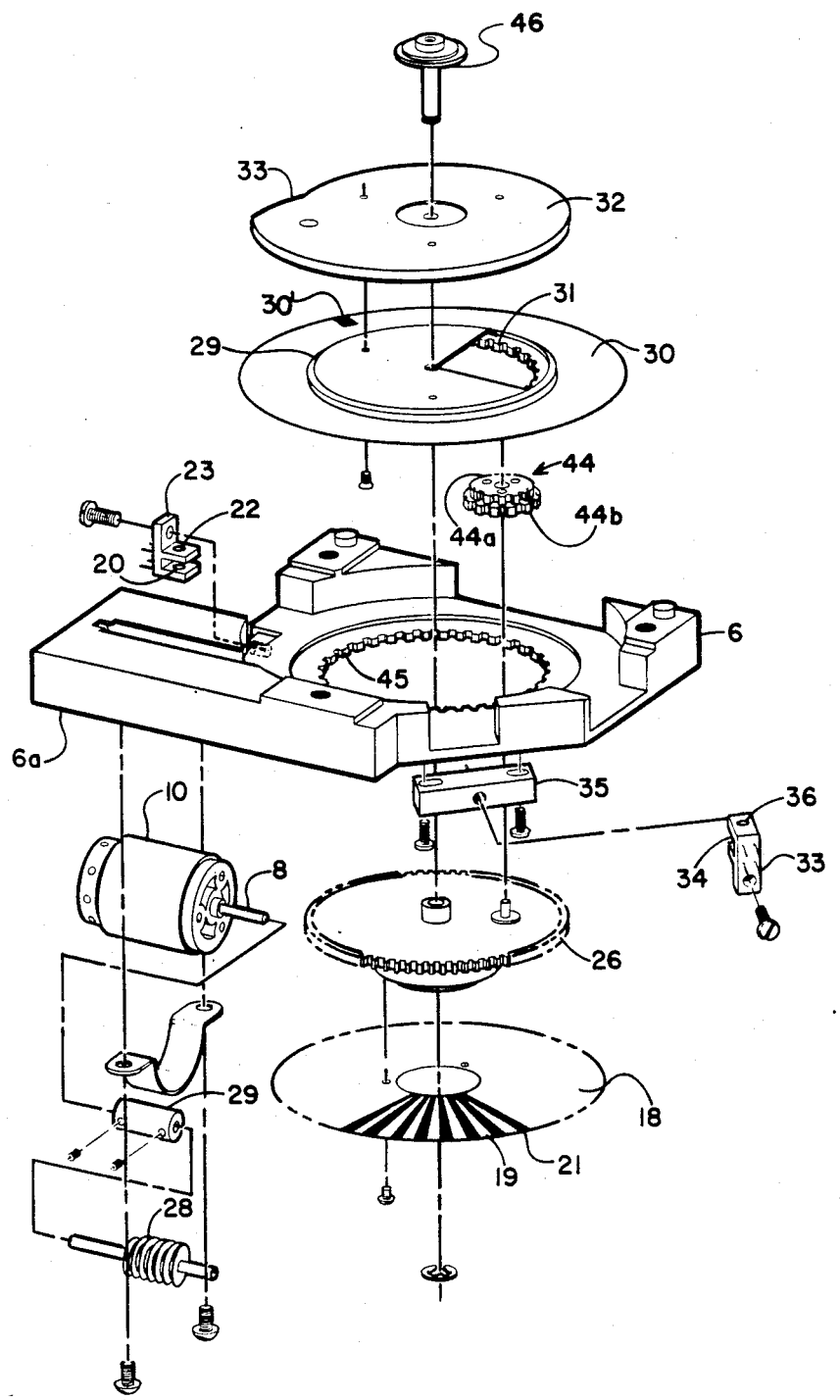
FIG. 3 is an exploded view of a portion of the tracking servo shown by FIGS. 1 and 2.
Figure 4:
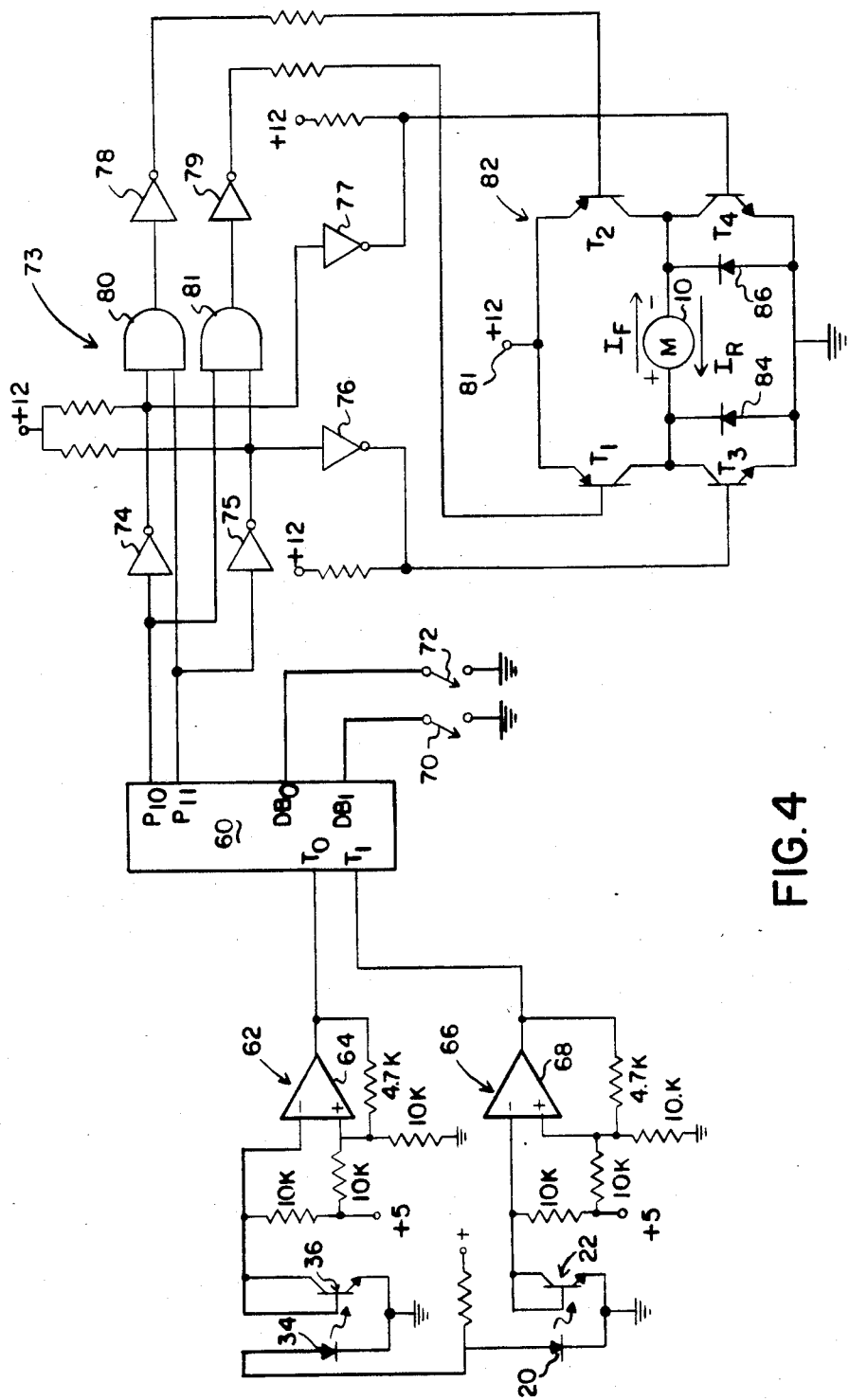
FIG. 4 is a circuit incorporating a microprocessor for operating the tracking servo shown by FIGS. 1-3 in accordance with the invention.

The reversible DC motor 10 is driven either forward or backward by an analog voltage signal generated by the control circuit shown by FIG. 4. (We have adopted the following convention for forward and backward: forward movement is that which causes the head 12 to move from the outside of the disk 14 toward its center. Reverse movement is the opposite.) Timing feedback input signals for the circuit illustrated by FIG. 4 are generated by a configuration of timing wheels and sensors best shown by FIGS. 2 and 3. In particular, an edge of a timing wheel 18, having alternating light and dark areas 19 and 21 as shown in FIG. 3, is interposed between a light-emitting diode 20 and a photodiode 22. Both the diode 20 and the photodiode 22 are mounted in a sensor block 23 that is attached to the support block 6. The timing wheel 18 is attached to a worm wheel 26 which engages a worm 28 coupled to the shaft 8 of the DC motor 10 by a coupling 29. Thus a pulsating signal is generated by the photodiode 22 as the timing wheel 18, rotating with the worm wheel 26, alternately makes and breaks the light path between the light-emitting diode 20 and the photodiode 22.

Another timing wheel 30, having one dark area 30' (FIG. 3) on an otherwise light background, is mounted upon a support 29 that is attached to, and rotates with, a cam 32. A sensor block 33 supports a light-emitting diode 34 and a photodiode 36 on opposing sides of the timing wheel 30 (the positions of the diode 34 and the photodiode 36 are also shown by phantom lines in FIG. 2) The block 33 is hung off the support block 6 by an adjustable mounting block 35. When the light-blocking dark area 31 is interposed between the light-emitting diode 34 and the photodiode 36, the photodiode 36 generates a pulse signal representing a "home" position for the cam 32. This is the cam orientation that corresponds to a predetermined position of the head 12 toward the outer edge of the disk 14 and a specified distance from track 1. The "home" position can be adjusted for servicing and the like by slight movement of the adjustable mounting block 35.

The playback head 12 is attached to an elongated head carriage 38 having a slot 40A to accommodate the spindle 16. (Another slot 40B accomodates the axial fastener for the cam 32, which will be described later.) The head-supporting end of the carriage 38 is formed of two parts 41A and 41B. The end part 41A overlies end part 41B and supports the head 12 in contact with the magnetic disk 14. The end part 41B slides across the motor mounting block 6B, providing support for the rest of the carriage 38. A cam follower 42 extends from the opposite end of the carriage 38 (shown partially by phantom lines in FIG. 1 to reveal underlying components) and engages the camming surface of the cam 32. The follower 42 is held against the cam 32 by a spring 39 attached between the disk drive motor mounting block 6B and a lip on the carriage 38. As the cam 32 rotates, the head carriage 38 and the playback head 12 move forward or backward adjacent the magnetic disk 14. The cam 32 is adapted to move the head 12 from the last track to the first track, or from the first track to the last track, without changing its initial direction of rotation, e.g., moving forward through tracks ... 38, 39, 40, 1, 2, 3 ... etc., or backward ... 2, 1, 40, 39, etc. For this purpose the camming surface has a fast slope edge 33 (shown in FIG. 3) which permits the follower 42 to quickly cover its full travel.

Cam rotation is carried out by a planetary gear connection between the worm wheel 26 and the cam 32. An inner surface of the support 29 is removed and an internal spur gear 31 is provided on the inner circumference thereof. The internal spur gear 31 engages a two-part planet gear 44 which is mounted for rotation on an off-center section of the worm wheel 26. An upper part 44A of the planet gear 44 engages the internal spur gear 31 while the lower part 44B engages a planet grounding gear 45 formed in the support block 6. The cam 32, the various gears and the timing wheels 18 and 30 are fastened together by means of a shaft 46 rigidly mounted to a plate 50 (shown in FIG. 2) attached to the support block 6. The carriage 38 is also held in place adjacent the cam 32 by the plate 50.

It is helpful to describe parts of the circuit shown by FIG. 4 in connection with the corresponding program steps laid out in the flow charts shown by FIGS. 5-8. Throughout the following description, references to "program blocks" will be in connection with the steps shown by FIGS. 5-8 while references to circuit elements will be in connection with FIG. 4. (Not all parts of the flow charts need detailed explanation; those parts that do will be given "program block" references.) The central circuit element is a microprocessor 60. While many microprocessors will perform the control strategy according to our invention, we have selected an 8-bit single chip microprocessor from the Intel MCS-48 family. In particular, the following description will be in terms of an Intel 8048, 8049 or 8748 microprocessor. These microprocessors have a number of on-board features, including a resident program read-only memory (ROM), a resident data random-access memory (RAM), and a resident 8-bit timer and event counter.

Figure 5:
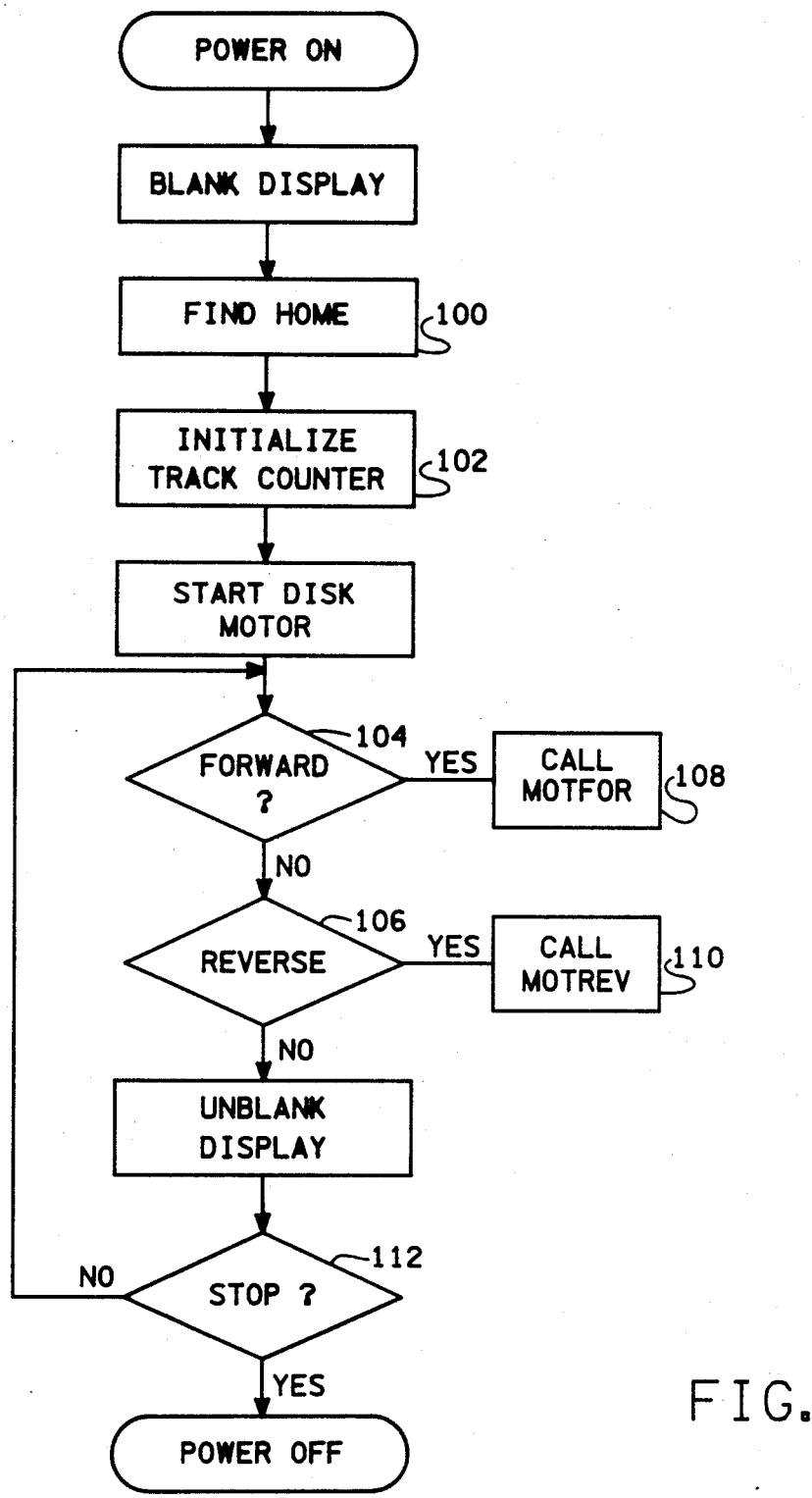
FIG. 5 is a flow chart of a main servo program for use with the microprocessor shown by FIG. 4.

The main program of the microprocessor 60 is shown by FIG. 5. With the power on, the video display (not shown as a circuit element) is blanked out and the cam 32 is driven to its "home" position (program block 100). As hereinbefore described, a pulse signal from the photodiode 36 determines when the "home" position is reached. Because of the possibility of noise on this pulse, it is processed by a Schmitt trigger circuit 62. (A CA 3140 operational amplifier 64 connected with the resistances as shown will provide the necessary positive feedback and dc supply to operate as a Schmitt trigger circuit.) The circuit 62 presents a "clean" reshaped pulse to the test input pin TO of the microprocessor 60 when the "home" position is reached. The main program includes a track counter (a part of the program) that contains the number of the picture track being viewed. When the "home" pulse appears on pin TO while the head is moving forward, the track counter is initialized (program block 102).

The test input pin T1 connects to the event counter resident upon the microprocessor 60. The event counter provides a count output signal representing timing feedback as to the amount of movement of the cam 32 and the playback head 12 therewith. The signal presented to the pin T1 is the pulsating signal generated by the photodiode 22 as the timing wheel 18 rotates, making and breaking the light beam from the light-emitting diode 20. Noisy pulses are reshaped by passing the signal through a Schmitt trigger circuit 66 (comprising an operational amplifier 68 and resistances as specified for Schmitt trigger 62).

After the disk drive motor is started and the magnetic disk 14 (FIG. 1) begins to rotate, the main program queries the state of a pair of normally-open switches 70 and 72 connected to two lines DB0 and DB1 (that is, two bits) of an 8-bit data bus acting as an input port. The momentary closing of switch 72 constitutes a command to move the head 12 in a forward direction toward a picture track. The momentary closing of switch 70 constitutes a command to move the head 12 in a reverse direction toward a picture track. The states of the switches 70 and 72 are determined by a pair of jump instructions (program blocks 104 and 106) which, if executed, call respective subroutines MOTFOR (block 108) and MOTREV (block 110). The MOTFOR subroutine initiates forward movement of the head 12 according to the flow chart shown by FIG. 6; the MOTREV subroutine initiates reverse movement according to the flow chart shown by FIG. 7. When either subroutine is finished the microprocessor 60 returns to the main program and resumes execution. The display is then unblanked so that a still picture can be played back. As long as the jump instruction for STOP is being executed (program block 112), the program repeatedly loops through the query of switches 70 and 72 and continuously displays a picture. When a command is received to shut down the playback apparatus (from circuit elements not shown), the jump instruction fails to execute and power is turned off.

The drive signals for operating the motor 10 are a pair of logic signals put out on two lines $P_{10}$ and $P_{11}$ (that is, two bits) of an 8-bit wide output port of the microprocessor 60. These logic signals are applied to a logic circuit 73 comprising inverters 74, 75, 76, 77, 78 and 79 and AND gates 80 and 81. The output of the logic circuit drives a bridge circuit 82 for operating the motor 10. Four transistors T1, T2, T3 and T4 switch the motor drive current supplied from a terminal 81 through the bridge circuit 82 for operating the motor 10 in a forward (by means of current $I_F$) or reverse (by means of current $I_R$) direction. With only T3 and T4 switched on, the motor 10 is shorted and a back electromotive force is generated that is conducted through either a diode 84 or 86 (which diode conducts depends upon which direction the motor was rotating before being shorted off). The resulting surge of current causes braking of the motor 10. In summary, the logic states of the signals on the lines $P_{10}$ and $P_{11}$ determine the condition of the transistors T1 ... T4 and the motor function, as shown in TABLE A:

TABLE A

| $P_{10}$ | $P_{11}$ | $T_1$ | $T_2$ | $T_3$ | $T_4$ | Function |
|---|---|---|---|---|---|---|
| 0 | 0 | OFF | OFF | OFF | OFF | Freewheel (no brake) |
| 0 | 1 | OFF | ON | ON | OFF | Reverse (active servo) |
| 1 | 0 | ON | OFF | OFF | ON | Forward (active servo) |

TABLE A-continued

| $P_{10}$ | $P_{11}$ | $T_1$ | $T_2$ | $T_3$ | $T_4$ | Function |
|---|---|---|---|---|---|---|
| 1 | 1 | OFF | OFF | ON | ON | Freewheel (brake) |

The practice of the invention involves the operation of the motor 10 under active servo control during a first component of track-to-track movement (the reverse and forward functions in Table A) and without control other than braking during the remaining second component of track-to-track movement (the freewheel . . . brake . . . function in Table A). (For the present embodiment the freewheel . . . no brake . . . function is not used.) Active servo control is obtained by preloading the event counter in the microprocessor 60 with a selected number representing an intermediate control value, turning on the dc motor 10 and then counting from the selected number until an overflow is triggered and an interrupt is set. The timing for the overflow condition thus corresponds to the intermediate control value. At that point the dc motor 10 is turned off and begins to coast. At the same time the dc motor 10 is shorted (only transistors T3 and T4 on) and the motor is braked until it stops. More specifically, since the event counter is an 8-bit counter, it will count to 255 and then overflow to 0. The selected number preloaded into the event counter is therefore 255-n, where n represents the number of pulses (generated by the photodiode 22) that correspond to the first component of movement. The number n is predetermined for the first track-to-track movement (to the first picture track) and then is updated as more information comes in regarding any coasting irregularity for the particular dc motor 10 in use. The number 255-n is counted up until it overflows to 0, which triggers an interrupt indicating that the first component of movement is finished.

For the particular index wheel 18 that was used, 20 light-dark transitions pass the photodiode 22 for each movement of the head 12 from one track to the next (or the previous) track. This movement translates into 20 pulses. It was found that the dc motor 10 tended to coast through 8 light-dark transitions, and thus 8 pulses, after it is switched off (and braked). Each pulse is made to correspond to one count of the event counter. Consequently, for moving from one track to the next (or the previous track), the motor is turned on for 12 counts and then turned off and allowed to coast, in which time 8 counts elapse. The selected number, which is the count preloaded into the event counter, is therefore 255-12. However, due to unpredictable irregularities, like dirt in the gear train, the coasting period may sometimes be different than 8 counts. Therefore the event counter is read after the DC motor 10 has coasted to a stop. The value stored by the event counter at this time (recall that the counter registered zero when coasting began) is a final count value representing feedback as to the number of counts through which the motor actually coasted, that is, the second component of movement. If the final count value is not 8 counts, there are two courses of action. If the coast was such that the head 12 is not positioned close enough to the track to permit playback, active servo control is resumed and the dc motor 10 is jogged to make the required adjustment (by again preloading the event counter with 255-n, where n is the count necessary for the jog). However it was found that a misalignment within certain limits is generally acceptable for playback; from a head position centered on one track to a position relative to a second track, the misalignment seldom exceeds those limits. The greater problem is the accumulation of errors as the head moves from the second to the third track and thereafter across many other tracks on the magnetic disk 14. Eventually playback will fail as the head is completely misaligned (i.e., outside the limits) with respect to some track due to errors accumulating from several misalignments relative to several tracks.

Figure 6:
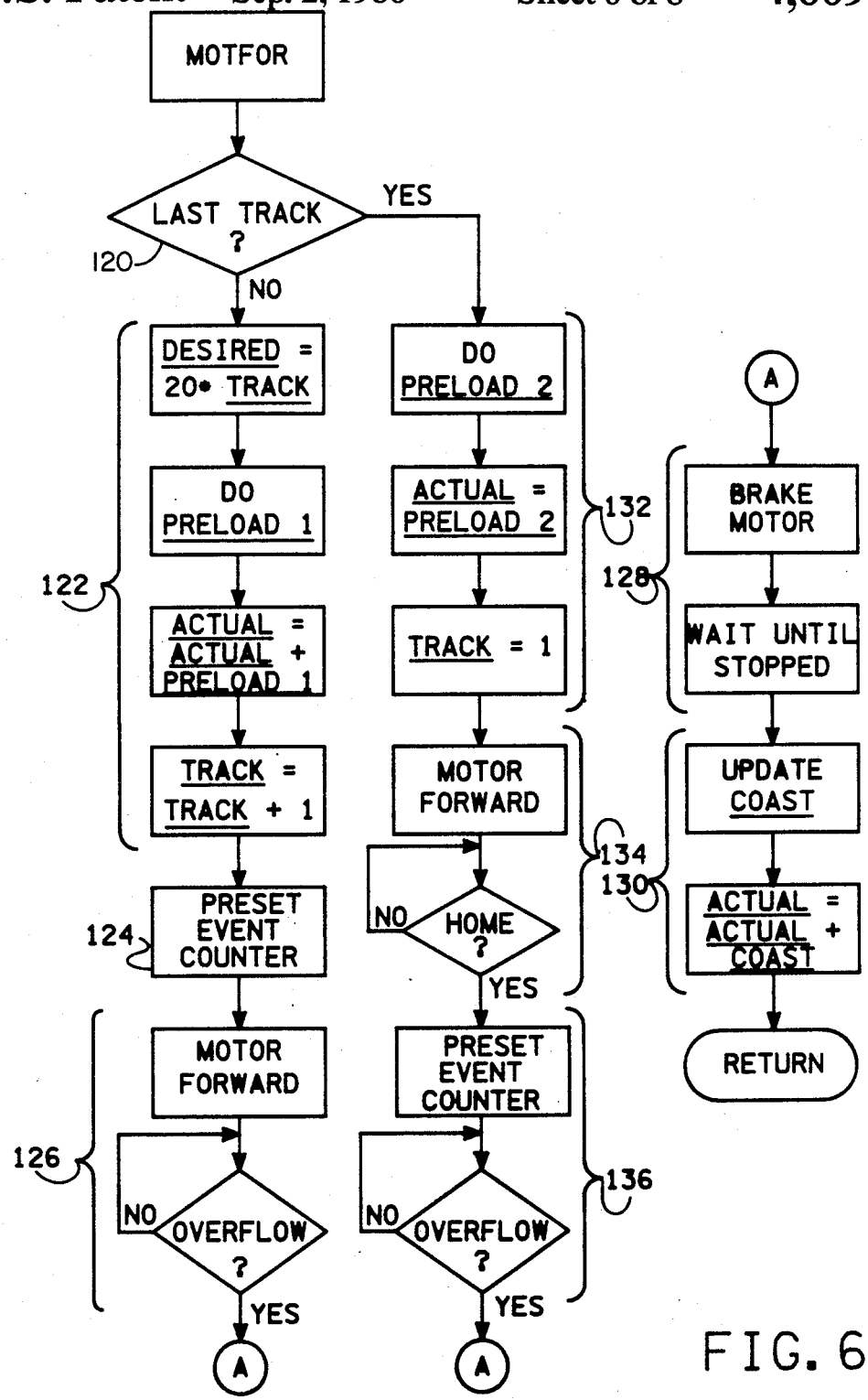
FIG. 6 is a flow chart of a program subroutine for operating the servomotor shown by FIGS. 1 and 3 in a forward direction.
Figure 7:
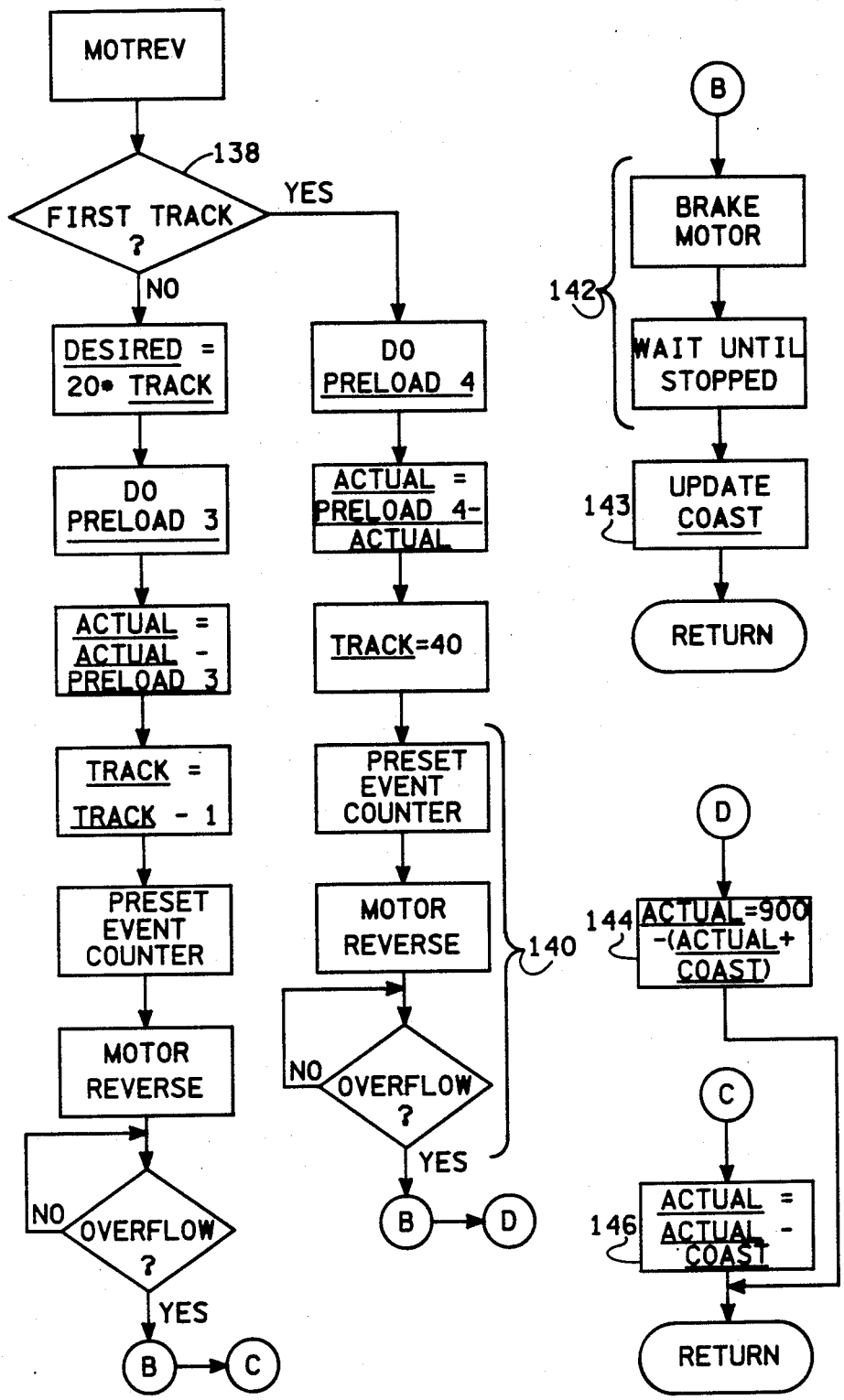
FIG. 7 is a flow chart of a program subroutine for operating the servo motor in a reverse direction.
Figure 8:
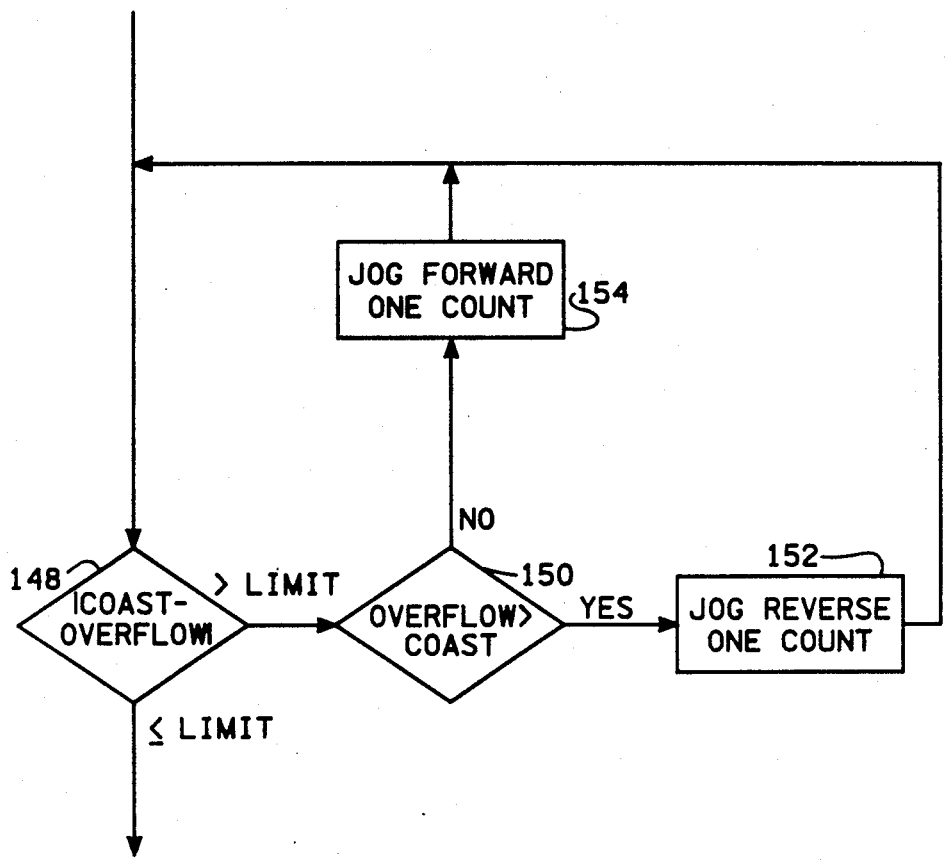
FIG. 8 is a modification applied to the flow chart shown by FIG. 6 in order to readjust the tracking servo relative to a particular track.

These considerations lead to the preferred second course of action, as follows. The number of counts for which the motor is on during the next track-to-track movement is adjusted to account for the actual misalignment of the head 12 relative to the present track location. This adjustment accounts for coasting irregularity in the present track-to-track movement. As a further refinement, the actual coast count, that is, the final count value in the event counter, becomes the assumed coast count for the next movement. Since the irregularities are usually continuous, at least for the time being, this builds the correction into future track-to-track movement. FIGS. 6 and 7 show the program flow charts for initiating and controlling movement of the dc motor 10, and head 12 therewith, according to the practice just described. FIG. 6 implements the MOTFOR subroutine (block 108 of FIG. 5); FIG. 7, the MOTREV subroutine (block 110).

The basic count calculation is designated as PRELOAD. The value of PRELOAD is the number n that is used to generate the count value for operating the dc motor 10; it is subtracted from 255 and the result is the selected number preset into the event counter before the motor 10 is turned on. When the disk player is first turned on, the servo automatically seeks the home position (program block 100 in FIG. 5). When home is sensed, the number n=12 is used to preset the event counter and the dc motor 10 continues for 12 counts. Then the motor is turned off and the head 12 coasts into position adjacent track 1. The overflow value in the event counter at this time becomes the first indication of the actual coasting distance. At this time the subroutines shown by FIGS. 6 and 7 may be entered. In these subroutines, the specific equation for the PRELOAD calculation depends upon whether the dc motor 10 is commanded to go forward or reverse, and whether the current track location is on the last track (for a forward command) or the first track (for a reverse command). This makes four equations for PRELOAD, as follows:

1. PRELOAD 1 (forward)=(DESIRED-ACTUAL)+(20-COAST)
2. PRELOAD 2 (forward from last track)=20-(COAST+1)
3. PRELOAD 3 (reverse)=(ACTUAL-DESIRED)+(20-COAST)
4. PRELOAD 4 (reverse from first track)=(ACTUAL+100)-(COAST+1)

Four variables enter into these equations, explained as follows:
 1. DESIRED is the count value for where the head 12 should be located, under ideal conditions, relative the track currently being accessed. DESIRED=20 * TRACK.
 2. TRACK is the number assigned to the track currently being accessed, i.e., 1, 2, 3 . . . 40 (last track). Thus DESIRED takes on the values 20, 40, 60 . . . 800 (last track).
 3. ACTUAL is the count value for where the head 12 is actually located relative the track currently being accessed. It is initialized whenever the home position is sensed and incremented thereafter for actual head movement.

4. COAST is the count value corresponding to the distance through which the head 12 moves after the dc motor 10 is turned off. It is initialized to a particular value (in this case, 8 counts) when the disk player is first turned on and then updated for each movement by resetting it equal to the overflow count in the event counter after each movement is complete.

Referring first to FIG. 6, it is necessary to initially determine if the head 12 is on the last track (program block 120) by checking the TRACK value (which, for our embodiment, would be 40 for the last track). If not the last track, the next step outlined by program block 122 is to calculate PRELOAD 1 and to update ACTUAL and TRACK. Note that ACTUAL is updated in steps. The first step, at this point, is to update ACTUAL to where the dc motor 10 will take it while under servo control (i.e., while powered). Program block 124 subtracts the value of PRELOAD 1 from 255 and puts the result into the event counter. The dc motor 10 is turned on and the event counter is watched for overflow in block 126. When the overflow interrupt is seen, the motor is turned off and braked by turning transistors T1 and T2 off and T3 and T4 on (FIG. 4). Coincidentally a timer (not shown) is set in the program and after it runs out without seeing a count appearing on test input line T1 (FIG. 4), the motor is assumed to be stopped (program block 128). In program block 130, the COAST value is updated by setting it equal the overflow value in the event counter (the actual coast) and the second step of the ACTUAL update is completed by adding in the COAST value. At this point control is returned to the main program.

If the command is to go forward but the head 12 is presently on the last track, the alternative path from the block 120 is taken. PRELOAD 2 is calculated and the ACTUAL and TRACK values are updated in blocks 132. (Note that PRELOAD 2 uses (COAST+1). The additional count is added to include the acceleration of the cam 32 while traveling through its fast slope.) The motor 10 is turned on and the cam 32 is turned in a forward direction across its fast slope 33 until the "home" position is seen by the photodiode 36 (see FIG. 3 and program block 134 in FIG. 6). Note that the event counter is not operative at this time. When the home position is found (corresponding to count 0) the event counter is preset with 255-PRELOAD 2 and the motor continues to operate until the event counter overflows (program block 136). Then the MOTFOR subroutine resumes its regular path.

Since FIG. 7 mirrors the logic described in connection with FIG. 6, only differences related to reverse movement need to be described. Two program branches are shown. The main branch covers most movements and is similar to that of FIG. 6. The alternate branch is selected when the head 12 is presently on the first track and is commanded to go in reverse to the last track 40 (program block 138). For this situation the home position is not sought. The fast slope 33 of the cam 32 that was used equates to 100 counts (which explains the presence of 100 in PRELOAD 4). The event counter is immediately preset with 255-PRELOAD 4 and operated in reverse until the event counter overflows (program block 140). Then the head 12 coasts into position adjacent track 40 (note the additional count of 1 added to COAST to account for the momentum of this relatively longer movement). Both branches are then connected to program block 142 to stop the dc motor 10 and update COAST (block 143). However the update of ACTUAL is tailored to the particular branch (program blocks 144 and 146) that the program went through.

In some cases it may be desirable to readjust the position of the head 12 before viewing a given track. For forward movement, this may be done by inserting the program blocks shown by FIG. 8 between program blocks 128 and 130 as shown by FIG. 6 for the MOTFOR subroutine. The additional program blocks compare the expected COAST value with the actual overflow of the event counter (block 148). If the difference is greater than some predetermined tolerance limit, then the overflow is further tested to see if it is greater or smaller than COAST (block 150). If the overflow is greater, this means that the head 12 has overshot the track so a reverse jog is called for (block 152). Otherwise the head 12 needs to be jogged forward by one count (block 154). After the head movement settles down, COAST and the overflow are again compared and the process is repeated until the difference is within the limit. The same program blocks can be used between program blocks 142 and 143 in FIG. 7 except that program blocks 152 and 154 are interchanged such that the "yes" condition for block 150 triggers a forward jog and the "no" condition triggers a reverse jog.

The invention has been described in detail with particular reference to a presently preferred embodiment thereof, but it will be understood that variations and modifications can be effected within the spirit and scope of the invention.

I claim:

1. A servo control method for controlling a dc motor interconnected to a playback head in order to move the head between adjacent data tracks recorded on a disk, said method comprising the steps of:
    operating the motor to begin moving the head from one track toward an adjacent track;
    deriving a first counting signal related to the rotation of the dc motor and the movement of the head therewith between adjacent tracks;
    stopping the motor when the first counting signal corresponds to a first count value that provides for the expected coasting characteristics of the motor;
    deriving a second counting signal related to the movement of the head while the dc motor is coasting to a stop;
    deriving an error signal from the two counting signals; and
    modifying said first count value responsive to the value of said error signal after said dc motor has stopped whereby a departure from the expected coasting distance will not accumulate and further affect future track-to-track movements.

2. Self-compensating servo control apparatus for positioning a magnetic head with respect to adjacent magnetic data tracks separated by a predetermined distance on a magnetic disk, said predetermined distance being represented to the control apparatus by an expected control value, said apparatus comprising:
    a playback head for sensing the data recorded in the magnetic tracks;
    a movable carriage for supporting said playback head for movement therewith between adjacent magnetic tracks;

a dc motor operable in a powered mode during which said motor is continuously energized and a coasting mode during which said motor comes to a stop;

a geared drive train for interconnecting said dc motor with said carriage;

feedback means interposed in said drive train for generating an output signal corresponding to the amount of movement of said head between adjacent tracks;

means for generating an intermediate control value corresponding to a partial movement of said head between adjacent tracks;

means for operating said motor first in the powered mode until the output signal generated by said feedback means corresponds to the intermediate control value and thereafter in the coasting mode until said motor comes to a stop;

means for reading the final value of the output signal provided by said feedback means after the motor has stopped;

means for generating an error signal from the final value and the expected value; and means responsive to the error signal for adjusting the intermediate control value thus regulating the duration of the energized part of the next movement so as to compensate for irregularities due to coasting.

3. The apparatus as claimed in claim 2 wherein said geared drive train includes a configuration of gears to which a cam is attached and said movable carriage includes a cam follower for interacting with said cam to move the carriage.

4. The apparatus as claimed in claim 2 wherein said means for operating said motor additionally comprises means responsive to operation in the coasting mode for braking said dc motor while it is coming to a stop.

5. The apparatus as claimed in claim 2 wherein said means for operating said motor includes a counter and wherein said intermediate control value is entered into said counter and said correspondence of the output signal to the intermediate control value is accomplished by actuating said counter responsive to changes in the output signal.

6. The apparatus as claimed in claim 5 wherein said correspondence of the output signal to the intermediate control value is represented by an overflow of said counter.

7. The apparatus as claimed in claim 2 wherein said intermediate control value includes a factor representing the distance through which said motor, including said carriage and said head therewith, is expected to coast.

8. The apparatus as claimed in claim 7 wherein said means for generating an error signal includes means for updating the coasting factor following movement of said head between adjacent tracks.

* * * * *